United States Patent Office 3,517,869
Patented June 30, 1970

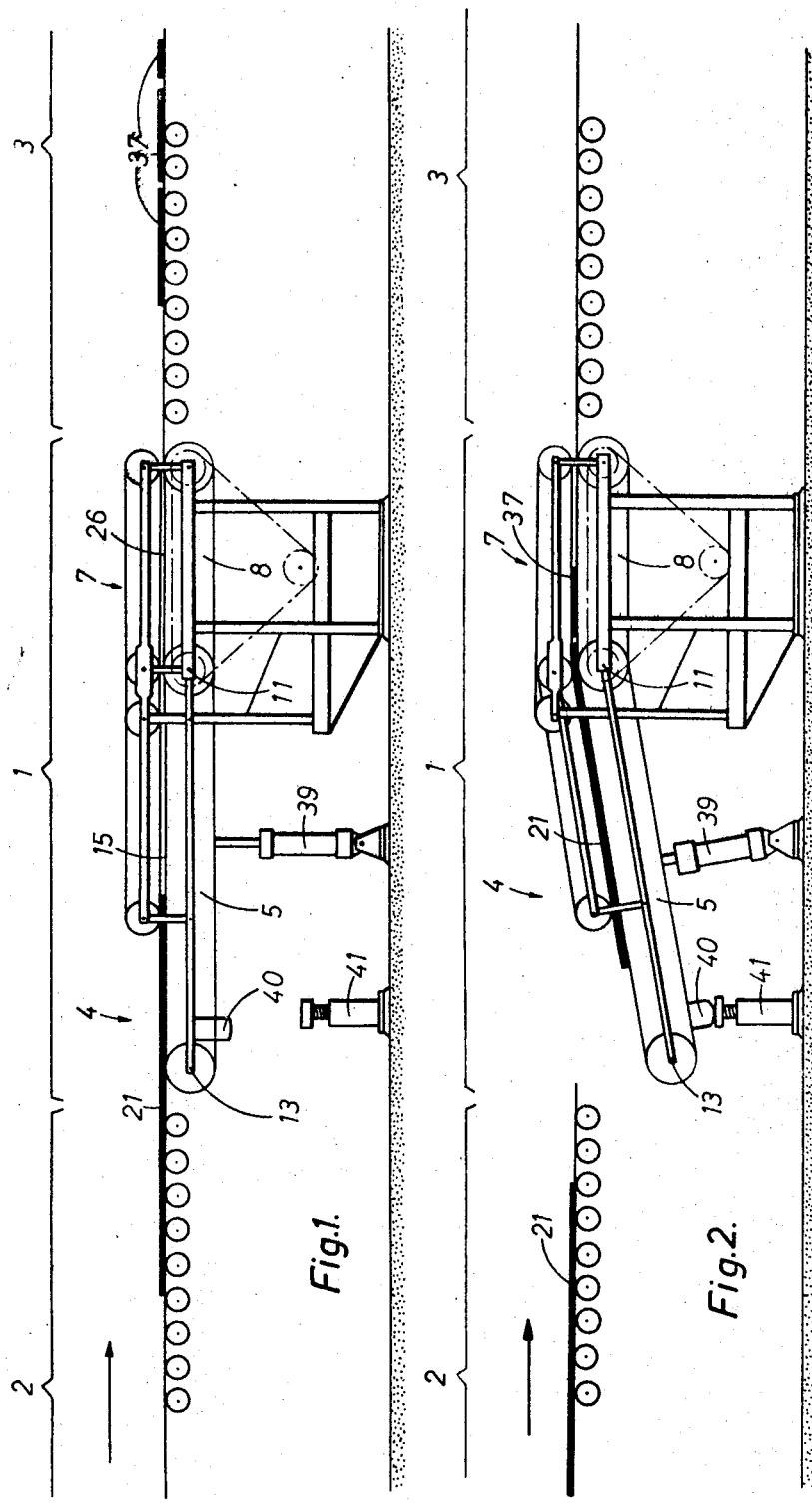

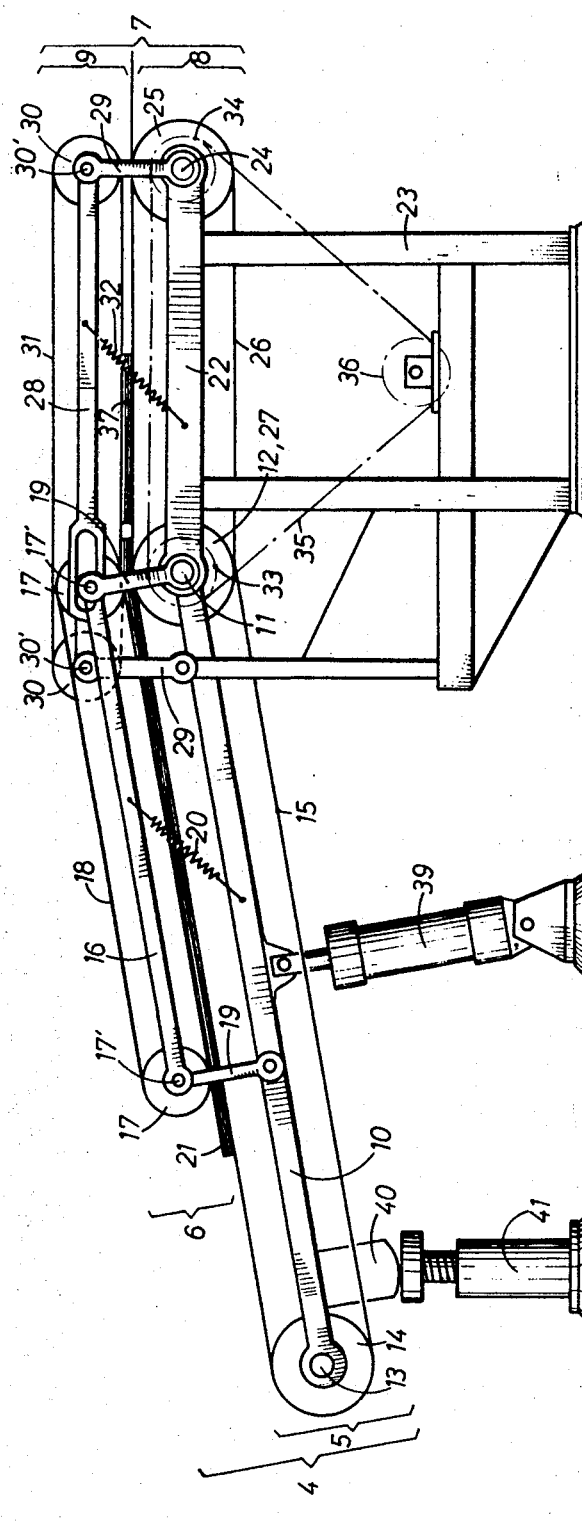

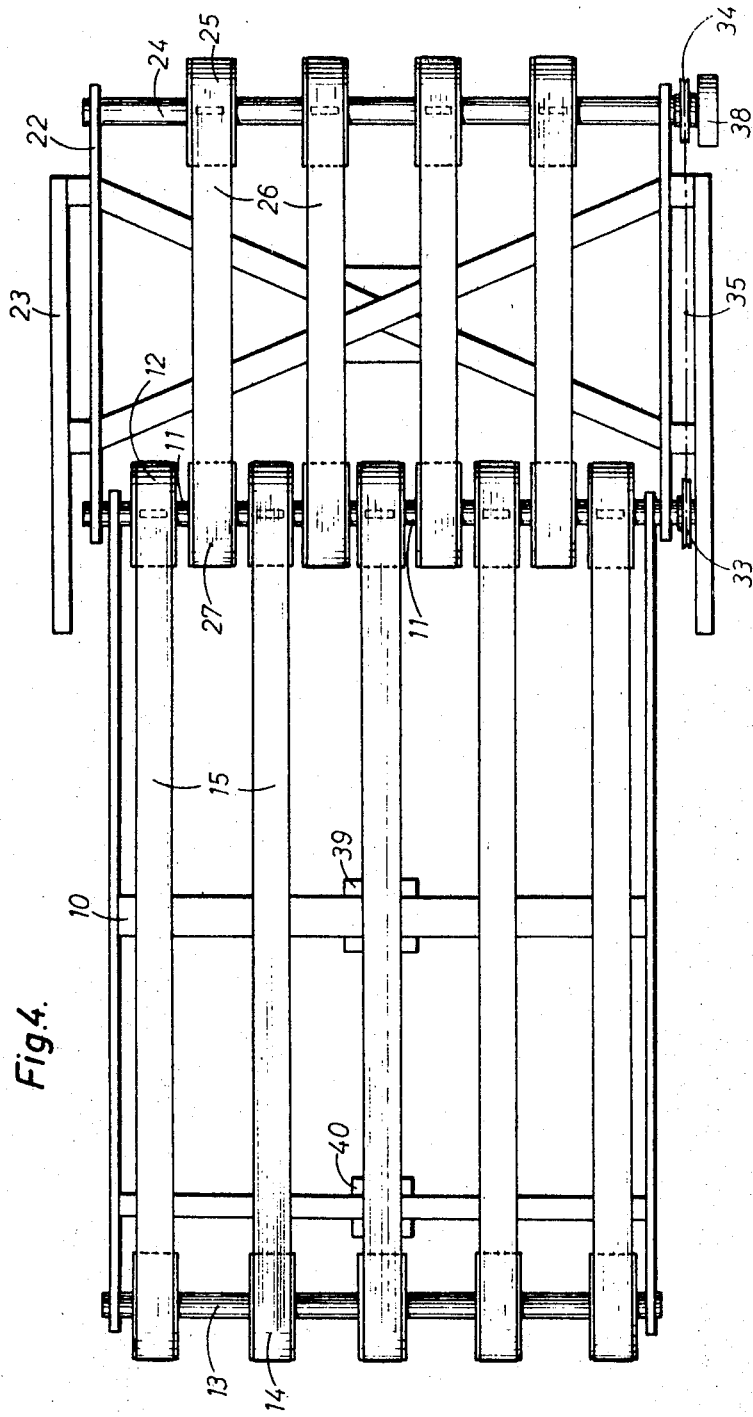

3,517,869
PROCESS AND ARRANGEMENT FOR BREAKING A SHEET OF GLASS
Jacques Max Charles Dryon, Auvelais, Belgium, assignor to Ateliers Heuze, Malevez et Simon Reunis Societe Anonyme, Auvelais, Belgium, a company of Belgium
Filed Feb. 26, 1968, Ser. No. 708,210
Claims priority, application Belgium, Apr. 13, 1967, 42,341
Int. Cl. B26f 3/00
U.S. Cl. 225—2                              15 Claims

ABSTRACT OF THE DISCLOSURE

A glass sheet is advanced in its own plane between a pair of conveyor members initially aligned in a common plane with a second pair of conveyor members, whereafter the first pair of conveyor members is tilted and the sheet is advanced over a breaking roller and into its original plane of advancement in the second pair of conveyor members, whereby the sheet can be broken by the roller along score lines initially provided in the sheet. The broken segments of the sheet are conveyed beyond the breaking roller by the second pair of conveyor members and the first pair of conveyor members is tilted back to its original position to receive the next successive sheet.

---

The invention relates to a process and an apparatus for breaking, during its continuous passage, a sheet of glass preliminarily scored at the places of breakage.

Generally, the breaking of moving sheets of glass is effected by causing, at a given point of a roller train, the sheets of glass to pass over a roller placed slightly higher than the others and by pressing the sheets on this train by means of counter-rollers acting on their upper face on both sides of this raised roller.

For this reason, the sheets of glass undergo in their travel a sharp flexure which brings about the opening out of the scored lines at the moment of their passage at this place.

According to this process, there are produced in fact three flexures:

a first flexure tending to close the scoring when the sheet rises on the opening-out roller;
a second flexure, in the opposite direction, on the opening-out roller; it is this which normally opens out the scoring and brings about the breakage;
a third flexure, in the same direction as the first, when the sheet descends from the opening-out roller.

When the speed of passage of the sheets becomes considerable, the break according to this process is generally no longer clean; the lips of the cuts are generally chipped as are the front and rear edges of the sheets, as a result of the shocks which they receive when they strike against the opening-out roller or the counter-rollers. For thin glass, premature and deviant fractures are often produced during the first flexure tending to close the score.

Moreover, when the thickness of the glass is to be changed, the level of the opening-out roller must be altered, as well as the counter-rollers, which involves delicate adjustments.

The process according to the present invention remedies these disadvantages.

In accordance with this process, the sheet of glass is passed by a flat passage inclined at an angle such that the non-scored parts of the sheet can follow the incline without breaking and the sheet break at the scored place. According to this process, the sheet of glass undergoes a single flexure only which causes the score to open out to bring about the break, which allows the sheet of glass to travel at a considerably accelerated speed with respect to that permitted in the known processes.

An apparatus for carrying out the process according to the present invention comprises two successive pairs of parallel conveyors each composed of an upper conveyor and a lower conveyor between which the sheet of glass travels, the pairs of conveyors being arranged in planes forming between them an angle such that the non-scored parts of the sheet of glass pass without breaking while the sheet breaks at the scored places. This angle depends on the thickness of the sheet of glass, as well as the elasticity thereof.

The conveyors are constituted by several endless bands which are regularly spaced one from another and rotate around pulleys placed on spindles positioned at the extremities of the conveyors.

The lower conveyors meet at a common spindle carrying alternately one pulley from the one and one from other conveyor. They are driven by a control communicating to the conveyor situated below the common spindle a speed equal to or, preferably, slightly greater than that of the conveyor situated above this spindle.

The lower conveyor situated below the common spindle is provided with a control operating the spindle positioned at the lower extremity on which are keyed the pulleys of the endless bands, the corresponding pulleys on the common spindle rotating idle, while the lower conveyor situated above the common spindle is provided with a control operating the common spindle on which are keyed the driving pulleys of this latter conveyor.

The controlled spindles of the lower conveyors carry a toothed pinion operated by a chain passing over these pinions and over a pinion keyed on the shaft of a motor. The toothed pinion of the controlled spindle of the conveyor situated below the common spindle is, preferably, of a diameter slightly less than that of the pinion of the common spindle, with the effect of communicating to the cut-up masses of glass a speed slightly greater than that of the sheet of glass. This pinion is advantageously provided with a couple-limiting device, in order to avoid at the place of the common spindle a sliding between the sheet of glass and the endless bands of the conveyor situated below the common spindle.

The upper conveyors are mounted on the lower conveyors by the interposition of mobile links, ensuring the parallelism of the upper and lower conveyors of each pair of conveyors. Between these latter are stretched springs pulling the upper conveyor towards the lower conveyor.

Although the angle between the pairs of conveyors above and below the common spindle may be fixed and suitable for breaking sheets of glass of a constant thickness and of a given elasticity, it can be advantageous to render this angle adjustable in order to be able to adapt it to all current thicknesses and qualities of glass. To this end, one of the pairs of conveyors can be made suitable for carrying out a movement about the common spindle of the lower conveyors and thus comprises a stop of regulable height, limiting downwardly the pivoting of this pair of conveyors. Also, the lowered pair of conveyors can form with the other pair of conveyors the favorable angle to bring about at the scored places the breaking of the sheet of glass passing between the upper and lower conveyors. The arrangement can include in this case a jack ensuring the lowering of the pair of conveyors suitable for pivoting about the common spindle of the lower conveyors and the raising of this pair of conveyors into the horizontal position to receive a new sheet for breaking.

The invention will now be described with reference to the accompanying drawings which show an embodiment of the invention but in no restrictive sense.

In the drawings:

FIG. 1 shows an arrangement according to the invention interposed in a production line, the arrangement being in the position for receiving a sheet of glass;

FIG. 2 is similar to FIG. 1, the arrangement being lowered in the position for breaking a sheet of glass;

FIG. 3 shows the arrangement on a larger scale in the position according to FIG. 2; and FIG. 4 is a plan view of the lower conveyors.

As FIGS. 1 and 2 show, the arrangement 1 according to the invention is interposed between a roller-train conveyor 2 bringing sheets of glass from a scoring-station, and a roller-train conveyor 3 removing the masses of glass after the cutting-up of the sheet.

Considering more particularly FIGS. 3 and 4, the arrangement according to the invention comprises a pair of conveyors 4, composed of a lower conveyor 5 and an upper conveyor 6, as well as a pair of conveyors 7, composed of a lower conveyor 8 and an upper conveyor 9. Under these circumstances, the pair of conveyors 4 is mobile and the pair of conveyors 7 is fixed.

The lower conveyor 5 is constituted by a frame 10 which is articulated at one of its extremities on a spindle 11, forming for this conveyor the control spindle on which are keyed drive-pulleys 12, and carries at its other extremity a spindle 13 with idle pulleys 14, forming the tension-spindle for endless bands 15 passing about the pulleys 12 and 14.

The upper conveyor 6 comprises a frame 16 with idle pulleys 17 mounted on two spindles 17' and endless bands 18 passing around pulleys 17. The frame 16 is connected to the frame 10 of the lower conveyor 5 by links 19, articulated on these frames. These links all have the same length, so that the upper conveyor 6 always remains parallel to the lower conveyor 5. Springs 20, stretched between the frames 10 and 16, cause a sheet of glass to be gripped between the endless bands 15 and 20 of the lower and upper conveyors of the pair of conveyors 4, whatever may be the thickness of the glass.

The lower conveyor 8 of the pair of conveyors 7 comprises a frame 22 which is integral with a support 23 and which carries the spindle 11, and a control spindle 24 on which are keyed pulleys 25. Endless bands 26 pass around the pulleys 25 and the pulleys 27 rotating idle on the spindle 11 constituting the common spindle on which the lower conveyors 5 and 8 meet.

The upper conveyor 9 of this pair of conveyors is constituted by a frame 28 which is connected to the frame 22 of the lower conveyor 8 by links 29 of similar length and frame 28 carries idle pulleys 30 mounted on spindles 30'; over pulleys 30 pass endless bands 31. Springs 32 stretched between the frames 22 and 28 cause the cut-up masses of glass to be gripped between the endless bands 26 and 31 which constitute the continuation of the inclined passage into which the glass passes to be broken at the scored places.

On the end of the controlled spindles 11 and 24 are keyed toothed pinions 33 and 34 driven by a chain 35 passing over a pinion 36 mounted on the outer end of the shaft of a motor with speed-reducing gear. The toothed pinion 34 is smaller than the pinion 33, so that the speed of the pair of conveyors 7 is greater than that of the pair of conveyors 4, in order to facilitate the removal of the cut-up masses of glass 37. To avoid too considerable friction by the endless bands 25 on the sheet of glass engaged simultaneously with the pair of conveyors 4 and the pair 7 at a greater speed of the endless bands, the toothed wheel 34 drives the spindle 24 by the interposing of a couple-limiting device 38 (FIG. 4) allowing a sliding between the spindle and the pinion.

According to the principle of the invention, the passage formed by the endless bands 15 and 18 of the pair of conveyors 4 forms with the passage constituted by the endless bands 26 and 31 of the pair of conveyors 7 an angle such that the sheet of glass may pass, without breaking, the incline formed at the intersection of the two pairs of endless bands, at the places where it does not carry scores, and may be broken at the moment of passage of a score over the incline.

In the embodiment described above of an arrangement embodying this principle, the pair of conveyors 4 is articulated on the spindle 11, common to the non-articulated pair of conveyors 7, and the angle appropriate for the breaking of the sheet at the scored place is achieved when the pair of conveyors 4 is in the lowered position. The frame 10 of the conveyor 5 is, to this end, provided wtih a jack 39 controlling the lowering of the pair of conveyors 4 and its raising into the horizontal position, as well as a block 40 which bears on a stop 41 of regulable height for limiting the lowering of the pair of conveyors 4 at the desired appropriate angle. As already shown, this angle depends on the thickness of the sheets of glass to be cut up and on the elasticity thereof.

For the operation of the arrangement described, reference will be made to FIGS. 1 and 2. FIG. 1 shows the mobile pair of conveyors 4 in the raised position so that the roller-train conveyor 2, the endless bands 15 of the lower mobile conveyor 5, the endless bands 26 of the lower fixed conveyor 8 and the roller-train conveyor 3 are in the same plane. In this position, the sheets of glass 21, the length of which can correspond substantially to that of the endless bands 15, are passed successively from the scoring station on these bands 15 by the roller-train conveyor 2. When a sheet is placed on the lower conveyor 5, the latter is lowered from the side of the spindle 13 to cause its block 40 to rest on the stop 41 and it remains in this position until the whole sheet has crossed the inclined passage formed at the place of the common spindle 11, by the two successive pairs of upper and lower conveyors. The jack 39 then immediately raises the pair of conveyors 4 to allow the conveyor 5 to be loaded with a new sheet of glass, while the roller-train conveyor 3 removes the cut-up masses of glass 37 towards the next work-station or towards storage.

As already set out, the arrangement described is not the only one possible for carrying out the process according to the invention. The pairs of conveyors 4 could remain permanently in the horizontal position and the pair 7 be lowered downwardly and unload the cut-up masses of glass onto a roller-train conveyor 3 situated at a level lower than that of the conveyor 2. The breaking angle between the two pairs of conveyors could then be fixed to suit a single thickness of glass of given quality, or be adapted to sheets of glass of any thickness and of variable properties.

Consequently, the invention is not limited to the embodiment which has been described and represented by way of example, and one would not depart from its scope by making alterations thereto.

I claim:

1. A process for breaking glass sheet comprising advancing a glass sheet in the plane thereof, receiving the sheet during its advancement in its plane, tilting the entire received sheet out of the original plane of its advancement, advancing the now tilted sheet in its plane which is inclined with respect to the original plane of advancement, passing the advancing sheet over a breaking roller and into its original plane of advancement whereby the sheet can be broken by said roller along score lines initially provided in said sheet and conveying broken segments of said sheet beyond said breaking roller in the original plane of advancement of the sheet.

2. A process as claimed in claim 1, wherein glass sheets are fed in sequence, the broken segments of one glass sheet being fed beyond the breaking roller while the next successive sheet is being received in preparation for tilting.

3. Apparatus for breaking glass sheet comprising first and second conveyors for the advancement of glass sheet, each conveyor comprising a pair of parallel conveyor members constituted as an upper conveyor member and a lower conveyor member between which the glass travels, said conveyors being arranged in succession and having a junction for the transfer of the glass sheet from one conveyor to the next, said conveyor members of each conveyor defining a path of travel for the sheet in its own plane, the conveyor members of the successive conveyors being inclined with respect to one another to define a change in angle for the path of the sheets at the junction, at least one of said conveyors including means at said junction over which the glass sheet passes and changes inclination in traveling from the first to the second conveyor whereby the sheet can be broken into segments along score lines initially provided in the sheet.

4. Apparatus as claimed in claim 3, in which each of the conveyor members is constituted by several endless bands regularly spaced from one another, each conveyor member comprising spindles positioned at the extremities of the conveyor and pulleys mounted on said spindles for the travel of the bands on the pulleys.

5. Apparatus as claimed in claim 4, in which the lower conveyor members of the two conveyors comprise a common spindle carrying alternately one pulley from one and one from the other conveyor, the latter pulleys constituting said means over which the glass sheet passes and changes direction.

6. Apparatus as claimed in claim 5 comprising means for driving conveyor members for the advancement of the glass sheet, the lower member situated downstream of the common spindle being driven at a speed slightly greater than that of the lower conveyor member situated upstream of said spindle.

7. Apparatus as claimed in claim 6 comprising means for driving the lower conveyor situated downstream of the common spindle including a control for operating the spindle at the lower extremity, on which spindle are keyed the pulleys of the endless bands, the corresponding pulleys on the common spindle rotating idle.

8. Apparatus as claimed in claim 6 in which the lower conveyor member situated upstream of the common spindle includes a control for driving the common spindle on which are keyed the driving pulleys of this conveyor.

9. Apparatus as claimed in claim 8, in which the driven spindles of the lower conveyor members carry a toothed pinion, a chain passing over these pinions and over a further pinion, and a shaft of a motor coupled to said further pinion in driving relation.

10. Apparatus as claimed in claim 9, in which the toothed pinion of the driven spindle of the lower conveyor member situated downstream of the common spindle has a diameter slightly less than that of the pinion on the common spindle and is provided with a couple-limiting device.

11. Apparatus as claimed in claim 3 comprising pivotal links between the upper conveyor members and the lower conveyor members of each conveyor to insure parallelism of the upper and lower conveyor members of each pair of conveyor members.

12. Apparatus as claimed in claim 11 comprising spring means between the upper and lower conveyor members of each conveyor pulling the upper conveyor member towards the lower conveyor member.

13. Apparatus as claimed in claim 3, in which one of the conveyors is supported for pivotal movement about said junction to vary said inclination, the apparatus further comprising means constituting a stop of regulable height for engaging said one conveyor for limiting the pivotal movement of this conveyor.

14. Apparatus as claimed in claim 13 comprising a jack engaging said one conveyor to pivot the same between an initial position in which the conveyors are in alignment and said one conveyor is adapted to receive said sheet, and a second position in which the conveyors are inclined with respect to one another.

15. Apparatus as claimed in claim 3 comprising means supporting the first conveyor for pivotal movement between a first position in alignment with said second conveyor and a second position in which said conveyors are inclined with respect to one another, and means for adjusting the conveyors to vary the angle of inclination therebetween.

References Cited

UNITED STATES PATENTS

| | | | |
|---|---|---|---|
| 2,311,995 | 2/1943 | Parker | 225—98 |
| 3,175,745 | 3/1965 | Insolio | 225—96.5 |
| 2,555,916 | 6/1951 | Clark | 225—98 |

FOREIGN PATENTS

| | | |
|---|---|---|
| 827,611 | 2/1960 | Great Britain. |
| 1,016,417 | 9/1957 | Germany. |

JAMES M. MEISTER, Primary Examiner

U.S. Cl. X.R.

225—96.5, 98